Patented Dec. 28, 1937

2,103,581

UNITED STATES PATENT OFFICE 2,103,581

VINYL RESINS

Daniel M. Gray, Wheeling, W. Va., assignor to Hazel-Atlas Glass Company, Wheeling, W. Va., a corporation of West Virginia No Drawing. Application April 25, 1934, Serial No. 722,400

9 Claims. (Cl. 106—22)

This invention relates to improvements in vinyl resins, particularly polymerized vinyl resins, and still more particularly to compositions containing mixtures of polymerized vinyl acetate resins and polymerized vinyl chloride resins.

Vinyl resins have many properties which make them desirable materials for protective coatings and also properties which make them useful in molded or formed articles. These resins are normally thermoplastic and may be subjected to a moderate degree of heat in the drying or baking of a lacquer made therefrom or in the forming of a molded article.

It is sometimes advisable, and even necessary, however, to subject them to temperatures in excess of those normally required in order to bring out other desirable properties. For example, vinyl resin lacquers require to be baked at a considerable degree of heat to secure necessary adhesion to metal surfaces. It has been found, for example, with lacquers made from mixtures of polymerized vinyl acetate and polymerized vinyl chloride, that a temperature of approximately 350° F. should be reached to secure satisfactory adhesion of the resin film to metal surfaces when these surfaces have not been previously coated or sized with another material. In the case of non-ferrous metals, these temperatures can be attained satisfactorily without harm resulting to the resin. When they are coated on ferrous surfaces, and even on such surfaces as commercial tin plate, decomposition and blackening of the film ensues.

One of the objects of this invention is to prevent this discoloration, blackening, and decomposition of the resin when coated on ferrous surfaces and subjected to relatively high temperatures. Another object of the invention is to overcome the discoloration, blackening and decomposition which ensue when polymerized vinyl resin molding compounds are formed and molded at relatively high temperatures. Normally, such high temperatures need not be employed in molding these compounds, but the resulting molded articles are still thermoplastic. It has been found that by employment of higher molding temperatures, as well as lengthening the time of heating in the mold, the resulting molded article shows plastic deformation at considerably higher temperatures. This is explainable by the fact that the higher temperature or longer time of molding further polymerizes these resinous products and confers upon them a higher thermosoftening point, and, in addition, enhanced chemical resistance.

The disadvantage of this practice lies in the fact that at the higher temperature or for the longer continued time, contact of the vinyl resin with the ferrous surfaces of the mold produces surface discoloration or blackening. Likewise, when ferrous parts are inserted as strengthening or reenforcing members in the molded article, decomposition is apt to occur at the surface of the resin adjoining such reenforcing member, resulting in a weakened bond between the resin and this member.

By extensive experiments with these vinyl resin materials, I have found that the addition of an organic basic material substantially reduces or entirely eliminates the discoloration, blackening, and decomposition of these resins when they are subjected to relatively high temperatures in the presence of iron, iron compounds or ferrous surfaces. There are also cases where impure vinyl resins are encountered, which contain traces of iron compounds. Such resins have been found to discolor and blacken at such relatively low temperatures as 250° F.

By the employment of organic basic substances in such materials, the blackening on heating has been overcome. Furthermore, the employment of these basic organic substances in the manner which will be later described does not materially detract from the physical or chemical properties of the resulting resin films or molded objects. Organic basic substances, such as amino and amido compounds, together with their substituted derivatives, have been found to satisfactorily accomplish the objects of this invention. Typical of such substances are: urea, methyl urea, triethanolamine, dipropanolamine, urea oxalate, dibenzylamine, triamylamine, diethylthiourea, thiourea, phenylthiourea, and benzylamine. The amount of inhibitor used may vary from 1% to 20% of the weight of the polymerized vinyl ester resin in the composition, depending upon the inhibitor and upon the conditions of temperature and time and the particular application which is to be made. For most purposes, it has been found that the inhibitor should be between 5% and 10% of the weight of the polymerized vinyl ester resin employed, but, in cases where particularly severe temperature requirements must be met, 20% of inhibitor functions more satisfactorily.

The manner of incorporating these various inhibitors depends largely upon the particular resin application which is to be made. For example, in the case of a lacquer or coating material, it is desirable to use a solvent in which the inhibitor and vinyl resin are mutually soluble, or at least a solvent which is compatible with the vinyl resin already in solution. The following examples illustrate the invention, but are not deemed to be in any sense limiting:

Example 1

| | Parts |
|---|---|
| Polymerized vinyl ester resin | 18 |
| Triethanolamine | 3 |
| Methyl isobutyl ketone | 60 |
| Dipropyl ketone | 12 |
| Ethylene glycol monomethyl ether | 10 |

In making up the above lacquer, it is preferable to dissolve the triethanolamine in the ethylene glycol monomethyl ether and add this to the vinyl resin already dissolved in the methyl isobutyl ketone and dipropyl ketone. Panels of commercial tin plate coated with this lacquer and baked at a temperature of 350° F. for five minutes produced very satisfactory results, whereas the same lacquer mixture, but without the addition of the inhibitor triethanolamine, was badly blackened and decomposed under the same conditions. Corresponding results are obtained to a greater or lesser degree with other organic basic inhibitors.

Example 2

| | Parts |
|---|---|
| Polymerized vinyl ester resin | 18 |
| Urea | 1.8 |
| Methyl isobutyl ketone | 60 |
| Dipropyl ketone | 12 |
| Ethylene glycol monomethyl ether | 20 |

This material, coated on commercial tin plate, and baked at 350° F. for five minutes, produced a tough, adherent, transparent and satisfactory film, while under the same conditions the above mixture, but without the urea, showed considerable areas of blackening and decomposition of the film. In the case of commercial tin plate, there are areas of exposed iron or areas of an iron-tin alloy, at which points contact of the vinyl resin film with the iron surfaces initiates an apparent breakdown or decomposition of the resin with resulting discoloration and blackening when subjected to relatively high temperatures, unless an inhibitor, as herein described, is employed.

It has been observed, in the case of films not containing any inhibitor, that, once decomposition of the film sets in at an area where the iron is exposed, this decomposition will spread through the film, even though exposed iron areas do not underlie all of the affected area. It is, therefore, important to prevent initiation of decomposition, and this is accomplished by the use of the inhibitors herein described.

In the case of molding compounds, where it is desired to hold polymerized vinyl ester resin molding compounds in a mold under heat and pressure at temperatures higher than are normally employed or for periods longer than are normally used, blackening on the surface of the molded article, where it contacts the iron mold, may be overcome by the incorporation of a basic organic material as described. A convenient method of incorporating such inhibitor is by grinding it with the molding compound or by working the mixture on calender rolls, or by dissolving the inhibitor and the resin in a mutual solvent and evaporating the solvent, or by other convenient means.

The following example is typical of such a composition, but is not limited to the proportions given:

| | Parts |
|---|---|
| Polymerized vinyl ester resin | 50 |
| Cotton flock | 40 |
| Titanium dioxide | 10 |
| Urea | 2½ |

Another method which may be employed to accomplish the same results in the case of molding compounds is to spray the surface of the mold with a thin film of the inhibitor, either undiluted or dissolved in an appropriate solvent prior to the placing of the molding compound in the mold cavity. This has the desired effect of preventing the initiation of decomposition on the surface where the resin contacts the iron of the mold and eliminates the necessity of mixing the inhibitor directly with the molding material.

It will be further understood that, under certain conditions of exposure to temperature, polymerized vinyl ester resins have a tendency to blacken and decompose, even though they are not in contact with a ferrous surface or do not contain appreciable amounts of iron compounds. In such cases, it has been found that the use of a basic organic inhibitor materially lessens the extent and degree of this blackening and decomposition. It will also be understood that it is possible to incorporate the vinyl resin and inhibitor by mechanical means—such as, milling, grinding, working on compounding rolls, or by other suitable means, and this operation may be followed by heating of the mixture of resin and inhibitor to thoroughly incorporate the two, such mixture then being used as a starting point in lacquers, coating compositions, molding compounds and the like. Various other objects and advantages of the invention will be apparent to those skilled in the art.

Having fully described the invention, what I claim is:

1. A polymerized vinyl resin composition resulting from the polymerization of a vinyl compound and containing a basic organic inhibitor of discoloration of the vinyl resin on heating in the presence of iron, iron compounds or ferrous surfaces, said inhibitor being of the class consisting of urea, methyl urea, triethanolamine, dipropanolamine, urea oxalate, dibenzylamine, triamylamine, diethylthiourea, thiourea, and benzylamine.

2. A polymerized vinyl resin as defined in claim 1 in which the inhibitor is present in effective amounts from 1 to 20% of the weight of the resin.

3. A polymerized vinyl resin as defined in claim 1 in which the inhibitor is present in effective amounts from 5 to 10% of the weight of the resin.

4. A polymerized vinyl resin as defined in claim 1 in which the inhibitor is triethanolamine.

5. A polymerized vinyl resin as defined in claim 1 in which the inhibitor is urea.

6. A polymerized vinyl resin lacquer comprising a solution of polymerized vinyl resins resulting from the polymerization of vinyl compounds, and a basic organic inhibitor of discoloration of the vinyl resins on heating in the presence of iron, iron compounds or ferrous surfaces, said inhibitor being of the class consisting of urea, methyl urea, triethanolamine, dipropanolamine, urea oxalate, dibenzylamine, triamylamine, diethylthiourea, thiourea, and benzylamine.

7. A molding compound comprising a polymerized vinyl resin composition, resulting from the polymerization of a vinyl compound, and a basic organic inhibitor of discoloration of the vinyl resin on heating in the presence of iron, iron compounds or ferrous surfaces, said inhibitor being of the class consisting of urea, methyl urea, triethanolamine, dipropanolamine, urea oxalate, dibenzylamine, triamylamine, diethylthiourea, thiourea, and benzylamine.

8. A method of preparing an article of manufacture including polymerized vinyl resins in contact with iron, iron compounds or ferrous surfaces, comprising adding to polymerized vinyl resins resulting from the polymerization of vinyl compounds an organic basic inhibitor of the class consisting of urea, methyl urea, triethanolamine, dipropanolamine, urea oxalate, dibenzylamine, triamylamine, diethylthiourea, thiourea, and benzylamine, and heating the vinyl resins and inhibitor while in contact with the iron, iron compound or ferrous surfaces.

9. A method of preparing an article of manufacture including polymerized resins in contact with iron, iron compounds or ferrous surfaces, comprising adding to polymerized vinyl resins resulting from the polymerization of vinyl compounds an organic basic inhibitor of the class consisting of urea, methyl urea, triethanolamine, dipropanolamine, urea oxalate, dibenzylamine, triamylamine, diethylthiourea, thiourea, and benzylamine, and heating the vinyl resins and inhibitor to about 250° to 350° F. while in contact with the iron, iron compound or ferrous surfaces.

DANIEL M. GRAY.